Patented Oct. 14, 1924.

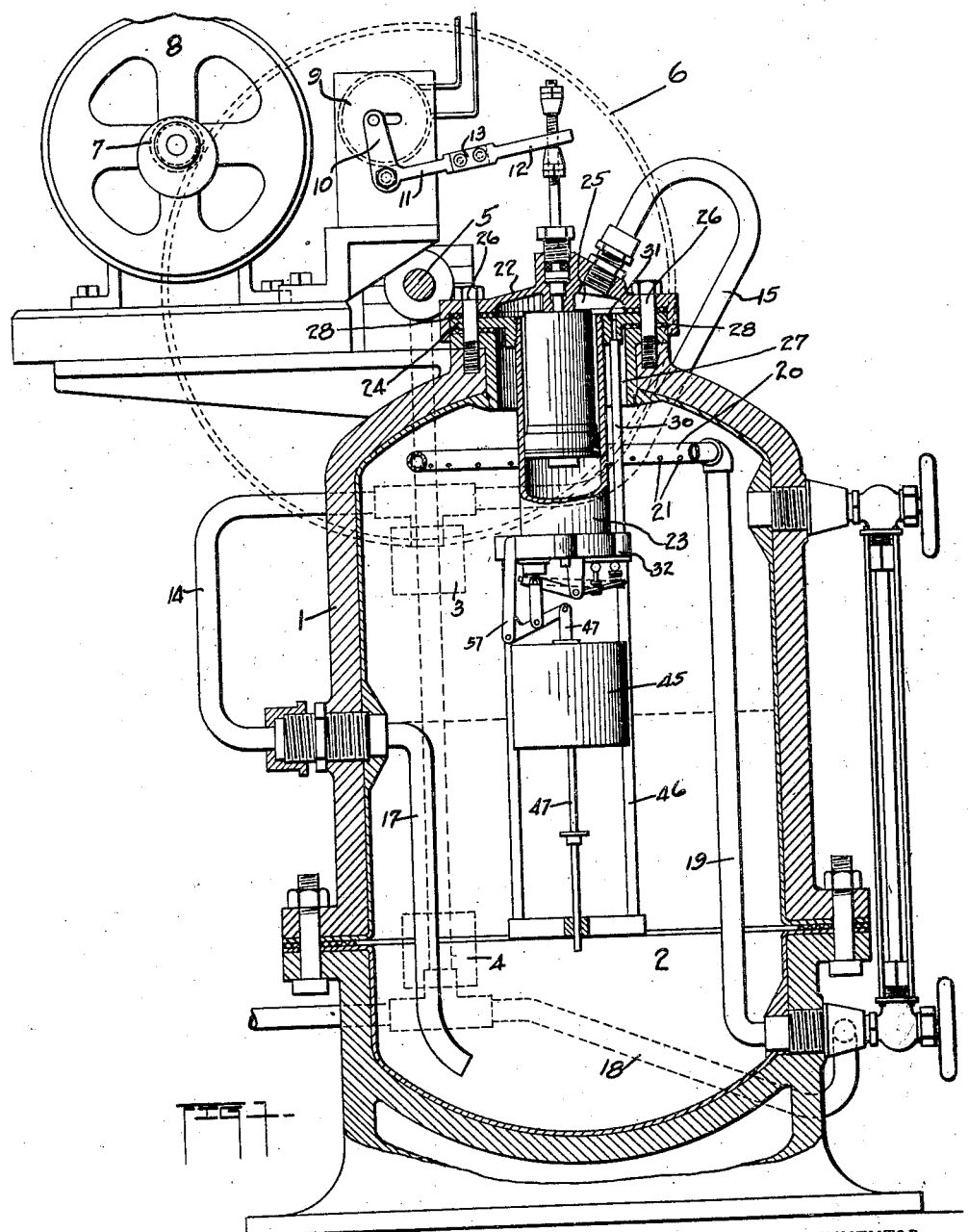

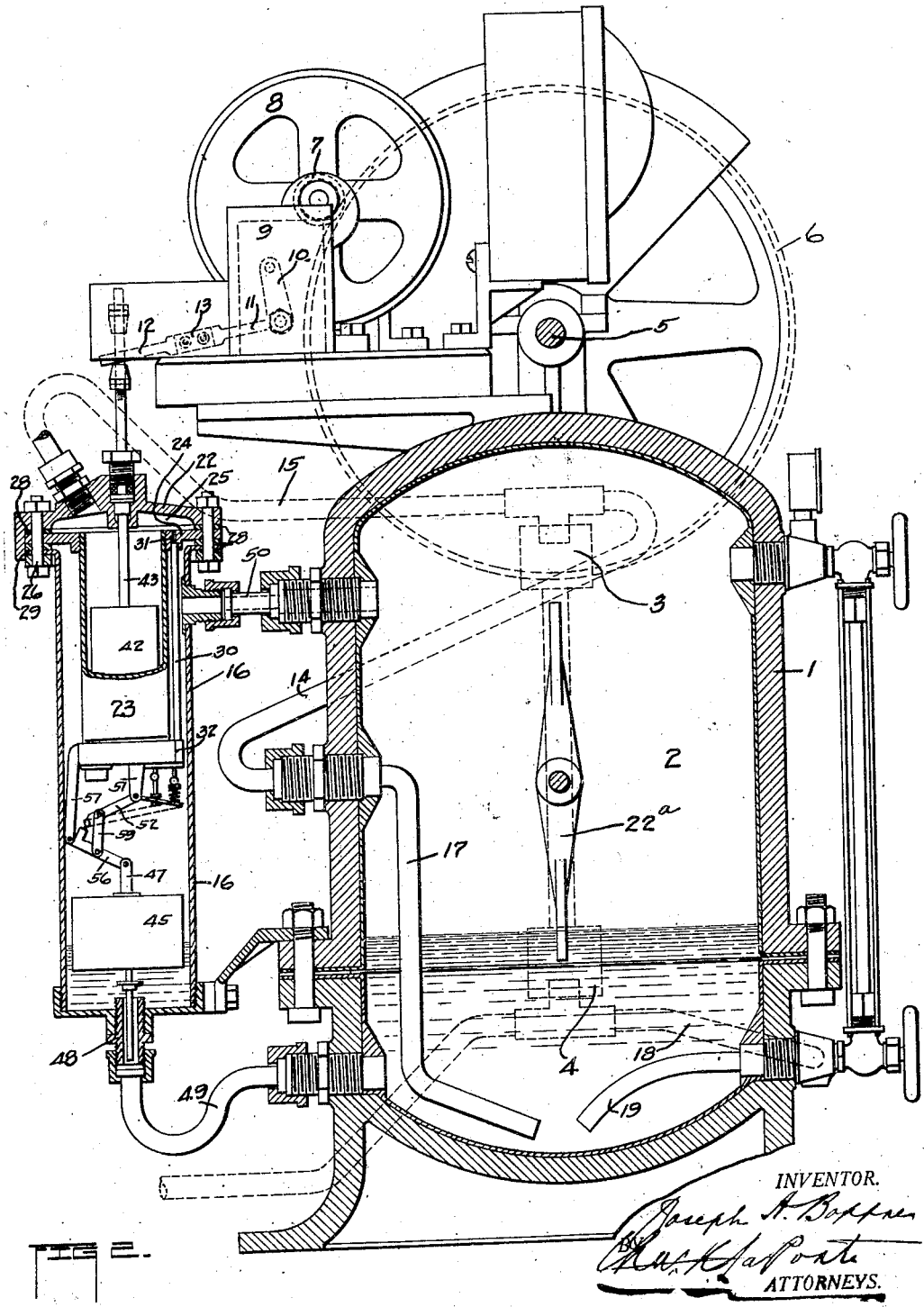

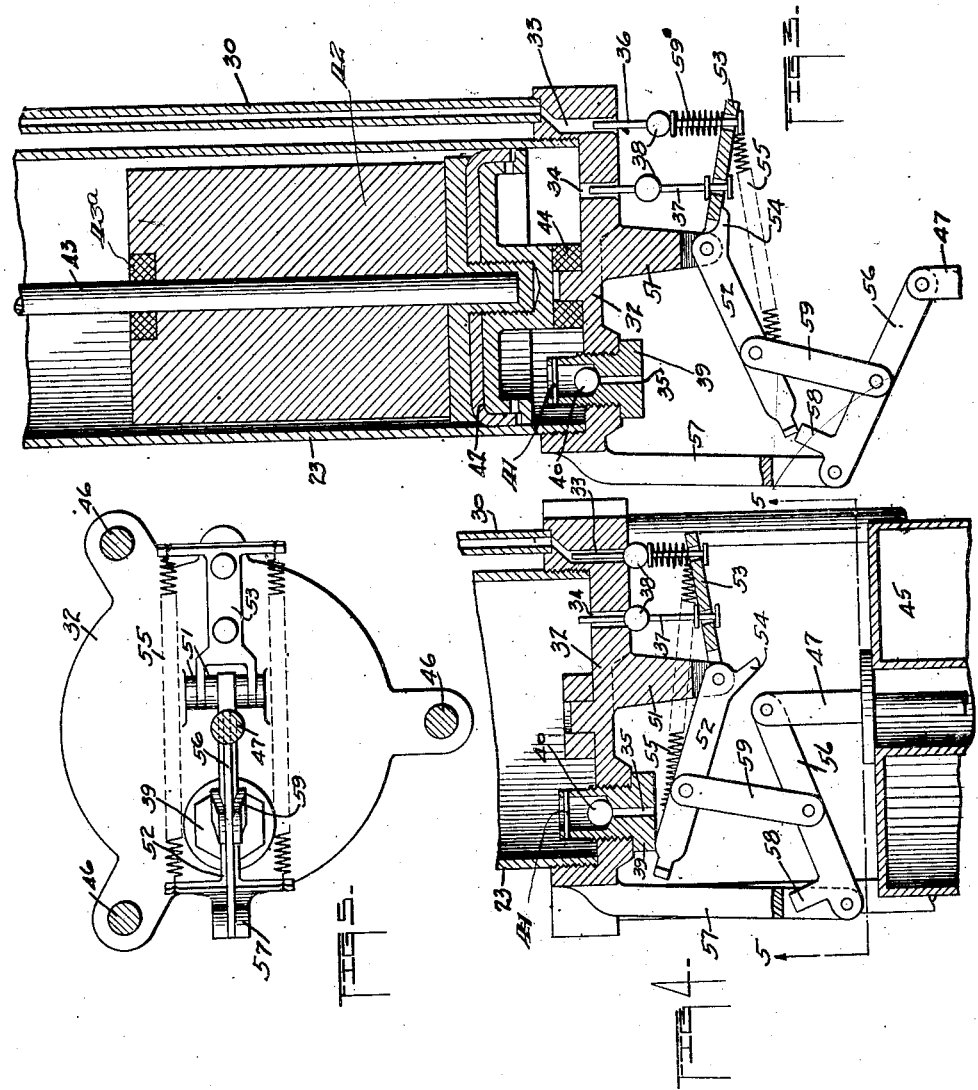

1,511,498

UNITED STATES PATENT OFFICE.

JOSEPH A. BOPPRE, OF DECATUR, ILLINOIS.

CARBONATING APPARATUS.

Application filed May 4, 1922. Serial No. 558,535.

*To all whom it may concern:*

Be it known that I, JOSEPH A. BOPPRE, a citizen of the United States, a resident of Decatur, in the county of Macon and State of Illinois, have invented new and useful Improvements in Carbonating Apparatus, of which the following is a specification.

This invention has reference to carbonating apparatus in which carbonic acid gas under pressure is combined with water or other liquid, to produce a carbonated beverage.

The invention has for its principal object to provide a new and improved controller for machines of this character which is constructed to be removably supported wholly within the mixing chamber and as a unit of mechanism which includes a float, a weighted piston arranged to have connection with a switch controlling the motor for actuating the gas and water pumps, and valve mechanism controlling the ingress and egress of gas to and from the piston cylinder or casing, certain elements of which are actuated by the rise and fall of the float which is controlled by the height of water in the mixing chamber.

The invention comprehends a unit of mechanism such as above referred to which is not only adapted to be supported wholly within the mixing chamber of a carbonating apparatus, in which case the controller is operated by the gas within the mixing chamber, but said mechanism is arranged to be supported wholly within a casing separate from but adapted practically to all makes of carbonating apparatus, in which case the controller is operated from the gas within the mixing chamber of the apparatus.

The unit of mechanism when employed within the mixing chamber of the apparatus is preferably associated with means for spraying water through the gas, and when employed in connection with a casing separate from the apparatus, the mixing chamber of the latter may be provided with water and gas agitating means, if desired.

Further aims, objects, and advantages of my invention will become apparent—as it is better understood by reference to the following description when taken in connection with the accompanying drawings illustrating a preferred embodiment thereof, while its scope will be more particularly pointed out in the appended claims.

Referring to the drawings:—

Figure 1 is a vertical sectional view of the mixing chamber of a preferred form of carbonating apparatus with my improved controller removably suspended therein, the view also showing in a diagrammatic way the gas and water pumps, the piping connected thereto, also the motor and switch control means for the motor;

Figure 2 is a view somewhat similar to Figure 1, except that the controller is shown wholly supported within a casing separate from the apparatus but connected to receive the gas therefrom;

Figure 3 shows in detail the piston, piston casing or cylinder and valve mechanism of the controller, the valves controlled by the float being in open position;

Figure 4 is a view somewhat similar to Figure 3 except the piston is omitted, the float is partly shown and the valves controlled by the float are shown in closed position, and Figure 5 is a plan looking upward, as the same would appear if taken on the line 5—5 Figure 4, looking in the direction of the arrows.

Like characters of reference denote corresponding parts throughout the figures.

In a general way there is little or no difference in the construction of the apparatus shown in Figures 1 and 2, except that in Figure 1 the controller mechanism is suspended wholly within the mixing chamber, while in Figure 2 such controller mechanism is suspended wholly within a casing separate from the main apparatus, therefore the designation of similar parts will be by similar characters of reference. In Figure 1 there is represented a carbonated apparatus furnished complete with my improved controller, while in Figure 2 there is represented a controller embodying my invention in the form of an attachment to be coupled to practically all makes of carbonators. In the form in which the controller is shown in Figure 1, it is also exhibited as an attachment for carbonators of the type shown.

The carbonating vessel proper is designated 1 enclosing a mixing chamber 2 for the carbonic acid gas and water. 3 and 4 respectively, designate the gas and water pumps, preferably diagrammatically shown in dotted lines. The pumps are operatively connected in any well known manner, with pump actuating means including a shaft 5 connected by gearing 6 and 7 with a suitable motor 8 controlled by a switch 9 provided with the switch lever 10 constructed of separable parts 11 and 12 detachably connected at 13 in a suitable manner and for purposes to be explained. Gas is supplied in the usual manner and through the action of pump 3 and a pipe 14 connecting the pump with the vessel 1 is pumped into the chamber 2, also taking the gas from the chamber 2, in a manner to be explained, and pumping it back again into said mixing chamber. In Figure 1 the pump 3 is connected to the dome of the vessel 1 through a pipe 15, whereas this pipe 15 in Figure 2 is connected with the head end of a casing 16 which encloses and sustains the controller to be described. Both in Figures 1 and 2 a pipe 17 coupled to the gas inlet pipe 14 discharges the gas forced into the vessel 1 preferably in the lower end thereof, as shown. The water pump 4 supplies water to the base of the vessel 1 through a pipe 18 connected with said pump and coupled to said vessel. In Figure 1 the water intake pipe 19 within the vessel leads to the top of the mixing chamber 2 and is connected to a preferably circular ring 20 provided with jets 21 whereby the water entering the mixing chamber 2 is sprayed or introduced in the form of a shower. This arrangement of water intake is preferable due to the cast, as will be explained, that the controller is suspended within the chamber 2 from the dome or head of the vessel 1. In Figure 2 the intake pipe 19 discharges the water in the lower end of the vessel, because in this form of apparatus the controller is carried within the separate casing 16 and an agitator 22ª suitably connected with the pump actuating means is rotatably arranged within the mixing chamber 2.

I have described in a general way the mixing chamber of the carbonating apparatus, the gas and water pumps, supply pipes, the motor and pump actuating means, but I am not concerned with the particular make of apparatus or its detailed construction, as these are well known in the art and well understood by those skilled in the art of carbonators. My invention lies in the controller and is applicable in two ways, as I shall explain, to carbonators.

The control unit as an attachment includes a head piece 22 to which is detachably connected and from which is suspended a cylinder 23. The preferred connection between head 22 and cylinder 23 is through a flanged ring 24 the latter being threaded internally and the cylinder screwed thereinto, as shown in Figures 1 and 2. The construction of the head is such that a chamber 25 is provided between the ring and head, as shown. In Figure 1 the head and ring are detachably connected by bolts 26 to the dome of the vessel 1 with the cylinder 23 suspended in the mixing chamber 2 of the vessel through an opening 27 in the dome, packing rings 28 being inserted between the vessel 1 and the ring 24 and between the latter and the head 22. By removing the bolts 26 the head 22 with the ring 24 and cylinder 23 may be lifted off and out of the vessel. In Figure 2 the foregoing described structure is identical with Figure 1, except that the upper end of the casing or cylinder 16 is preferably flanged outwardly, as at 29, and the parts bolted thereto by means of the bolts 26. In this instance the packing rings 28 are inserted between the flange 29 and the ring 24 and between the latter and the head 22. To the head 22 is coupled the pipe 15 whereby communication is formed between the chamber 25 and the gas pump 3, as shown. The cylinder 23 is of less diameter than the opening 27 in the vessel 1 Figure 1, and of less diameter than the casing or cylinder 16 Figure 2. This allows for a pipe 30 alongside the cylinder 23, which at its upper end is coupled to the ring 24 in which is an opening or duct 31 which provides for communication between the pipe 30 and the chamber 25 between the head 22 and the ring 24. The pipe 30 as well as the cylinder 23 have connection with a base 32, in a manner I shall explain. This base 32 is flanged and internally threaded that the lower end of the cylinder 23 may be screwed thereinto, best seen in Figures 3 and 4. Said base 32 is also provided with valve controlled openings 33, 34 and 35. The opening 33 is in communication with the lower end of the pipe 30 and the openings 34 and 35 communicate with the lower end of the cylinder 23. The valves for the openings 33 and 34 are substantially the same and include stems 36 and 37 movable in the openings 33 and 34 and are preferably provided with ball members 38 adapted to be seated against the lower ends of the openings 33 and 34, see Figure 4, to close these openings against the ingress and egress of gas. The opening 35 is preferably formed in a plug 39 threaded into an opening in the base 32 and said plug is provided at the upper end of the opening 35 with a seat arranged to be closed by the ball member 40 which rises and falls and is prevented from becoming dislodged by means of the obstruction or stop 41.

Reciprocally arranged in the cylinder 23 is a weighted piston 42, the same being connected with a stem 43 extending up and out through the top of the cylinder 23 and slidable through the head 22 and a packing 43ª secured therein in such a manner as to prevent leakage therethrough or therearound. The lower end of the weighted piston cushions on the cushion 44 when it drops to the lower end of the cylinder 23 and rests on the base 32.

The float 45 which is preferably located axially below the cylinder 23 and which is arranged to actuate the valves 38 controlling the openings 33 and 34 in the base 32 is sustained in a slightly different manner in Figures 1 and 2. In Figure 1 it preferably moves up and down on a frame 46 suspended or depending from the base 32, whereas, in Figure 2 this frame is not needed, as the casing 16 serves as the guide. Extending approximately axially through the float is a rod 47. In Figure 1 the lower portion of this rod is reciprocal through the base of the frame 46, whereas, in Figure 2 it is reciprocal in a coupling 48 through which water enters the casing 16; said coupling being connected by a pipe 49 with the vessel 1. Gas enters the casing 16 at or near its top through a pipe 50 coupled to the vessel 1 and to said casing, see Figure 2.

The opening through the float 45 for the rod 47 is of a diameter to allow side play of this rod to give freedom in the actuation of the means for operating the valves 38. The valve operating means between the valve 38 and the float is best shown in Figures 3, 4 and 5 where the open and closed positions of said valves are very clearly seen. Depending from the underside of the base 32 is an extension 51 to which are pivoted and extend in opposite directions lever arms 52 and 53, the latter having connection with the stems 36 and 37 of the valves 38 for moving said valves as the lever arm 53 is oscillated up and down. The down movement of arm 53 is determined by its engagement with a lug or rest 54 on the arm 52, see Figure 3. The outer ends of the two arms 52 and 53 are connected by the spring 55 which acts to snap the two said arms 52 and 53 into valve open and closed positions as the float 45 is raised and lowered by the rise and fall of the water in the mixing chamber 2.

To the upper end of the rod 47 is pivotally connected a link 56 which, at its opposite end is pivotally connected to an arm 57 depending from the base 32, and said link has a stop member 58. Pivotally connected to the link 56 mediate its ends is a link 59 which, at its other end is pivotally connected to the lever arm 52 mediate its ends, the latter arm, adapted as shown in Figure 3 to engage the stop member 58 on the link 56. As shown in Figures 3 and 4 the valve stem 37 is positively actuated by the lever arm 53 whereas, a yielding connection is provided between the lever arm 53 and the stem 36, in the form of a spring 59' carried on said stem between the valve member 38 and said arm 53. As one end of the link 56 is fixed, except for its pivotal connection with the arm 57, as said link is swung on its pivot with the arm there must be slight lateral movement of the rod 47 in the float 45.

In Figure 1 the float 45 has been raised by the inflow of water pumped into the mixing chamber 2 which actuates the links 56 and 59 to operate the lever arms 52 and 53 to close the valves 38. In Figure 2 the carbonated water having been withdrawn from the apparatus permitting the float to lower in the casing 16 the links 56 and 59 are actuated to operate the lever arms 52 and 53 to open the valves 38. The lever arms 52 and 53 and spring 55 provide a substantial toggle-lever construction which requires slight movement before the spring 55 acts to snap the levers into open or closed position depending on the position of the float 45.

In the operation of the controller attachment the motor 8 is shut off through the oscillation of the lever arm 10 when the weighted piston 42 is raised to the position shown in Figure 1. Said lever arm is shown operatively connected in a suitable manner to the rod or stem 43, so that when said rod is raised with the weighted piston 42 the motor is shut off, and turned on when the rod 43 is lowered with the weighted piston, see Figure 2. In each instance, Figure 1 or Figure 2 by uncoupling the arms 11 and 12 at 13, removing the bolts 26 and uncoupling the pipe 15 from the head 22 of the controller attachment, the entire attachment including the cylinder 23, piston 42, float 45 and valve actuating mechanism may be removed from the vessel 1 or the casing 16, and as easily replaced.

Assuming the parts of the controller to be in the position shown in Figure 2 and Figure 3 and the pumps in operation the gas will enter the lower end of the cylinder through the opening 34 in the base and in the chamber 25 at the upper end of said cylinder through the opening 33 in the base, pipe 30 and opening 31 in the ring 24, while at the same time the mixing chamber is being filled with water which will float the float 45 to approximately the predetermined position, shown in Figure 1.

During this pumping operation it will be noted that the gas pressure is on both ends of the weighted piston. Also it will be noted that the pump 3 will take the gas from the cylinder above the weighted piston through the pipe 15 and pump it back again through the pipe 14 into the mixing chamber; this operation continuing until the predetermined amount of water raises the float 45 into the position shown in Figures 1 and 4 which will close the valves 38. This operation shuts off the supply of gas to the head end of the cylinder 23. However the gas pump continues in operation taking the gas from the upper end of the cylinder 23 and pumps it into the mixing chamber, where the pressure is now exerted on the ball valve 40, unseating it and applies the pressure directly on the weighted piston to raise it into the position shown in Figure 1 which movement operates the switch lever 10 through the connection provided therebetween and the rod 43 to shut off the motor 8, stopping the pumps 3 and 4, as will be understood. As soon as enough water has been used to lower the float 45 to the positions shown in Figures 2 and 3, the valves 38 are opened admitting pressure to the top of the piston 42 and its escape from below the piston, which equalizes the pressure on both sides of the piston when it will drop by gravity and in so doing will, through the connection of the rod 43 with the switch lever 10 actuate the latter to again start the motor 8 and pumps 3 and 4.

While I have shown and described preferred embodiments of my invention, it will be obvious that various changes in minor mechanical details may be resorted to without departing from the spirit and scope of the invention or sacrificing any of the material advantages thereof.

What I claim is:—

1. An attachment for a carbonating apparatus, comprising a supporting head arranged for securement to a container, a cylinder suspended from said head and arranged to be enclosed wholly within such a container, a piston reciprocally arranged in said cylinder, a float located below the cylinder, valve mechanism associated with the lower end of the cylinder, and valve actuating mechanism operatively connected with said float.

2. An attachment for a carbonating apparatus, comprising a supporting head arranged for securement to a container, a cylinder suspended from said head and arranged to be enclosed wholly within such a container, a piston reciprocally arranged in said cylinder, a switch actuating member connected with said piston and operating through said head, a float located below the cylinder, valve mechanism associated with the lower end of the cylinder, and valve actuating mechanism operatively connected with said float.

3. An attachment for a carbonating apparatus, comprising a supporting head, a cylinder suspended from said head, a piston reciprocally arranged in said cylinder, valve controlled openings communicating with the lower end of the cylinder, a valve controlled duct communicating with the upper end of the cylinder, a float located below the cylinder, and valve actuating mechanism operatively connected with said float and certain of said valves controlling an opening to the lower end of the cylinder and opening to the lower end of the cylinder and one of said valves controlling the duct to the top of the cylinder.

4. An attachment for a carbonating apparatus, comprising a supporting head, a cylinder suspended from said head, a piston reciprocally arranged in said cylinder, a switch actuating member connected with said piston and operating through said head, valve controlled openings communicating with the lower end of the cylinder, a valve controlled duct communicating with the upper end of the cylinder, a float located below the cylinder, and valve actuating mechanism operatively connected with said float and certain of said valves controlling an opening to the lower end of the cylinder and one of said valves controlling the duct to the top of the cylinder.

5. An attachment for a carbonating apparatus, comprising a supporting head, a cylinder suspended from and detachably connected with said head, a base for said cylinder having openings therethrough certain of which communicate with the cylinder, a pipe in communication with the upper end of the cylinder and one of the openings in said base, a piston reciprocally arranged in said cylinder, a valve for controlling one of said openings in the base from the cylinder side, valves for controlling the other openings in the base from the underside, a float located below the cylinder, and valve actuating mechanism operatively connected with said float and with said last mentioned valves.

6. An attachment for a carbonating apparatus, comprising a supporting head, a cylinder suspended from and detachably connected with said head, a base for said cylinder having openings therethrough certain of which communicate with the cylinder, a pipe in communication with the upper end of the cylinder and one of the openings in said base, a piston reciprocally arranged in said cylinder, a switch actuating member connected with said piston and operating through said head, a valve for controlling one of said openings in the base from the cylinder side, valves for controlling the other openings in the base from the underside, a float located below the cylinder, and valve actuating mechanism operatively connected with said float and with said last mentioned valves.

7. An attachment for a carbonating apparatus, comprising a supporting head, a cylinder suspended from said head, a piston reciprocally arranged in said cylinder, a switch actuating member connected with said piston and operating through said head, a float located below the cylinder, valve mechanism associated with the lower end of the cylinder, a rod associated with the float, and valve actuating mechanism connecting said rod and valve mechanism including a pair of lever arms, springs connecting the same and link connections between one of said arms and said float rod.

8. An attachment for a carbonating apparatus, comprising a supporting head, a ring associated therewith, said head provided with means for coupling a gas pipe thereto, a cylinder detachably connected to and suspended from said ring, a base for said cylinder provided with openings therein, certain of which communicate with the cylinder, a pipe connected with said head and in communication with an opening therein and with the cylinder through said ring, a piston reciprocally arranged in said cylinder, a switch actuating member connected with said piston and operating through said head, valve means associated with the openings in said base, a float located below the base, and valve actuating mechanism connected with said float and with certain of said valve means.

9. In a carbonating apparatus, in combination, a container, means for introducing gas into the container, means for introducing water into the container, a motor for actuating said gas and water means, a controller for said motor comprising an attachment including a head, means for detachably connecting said head to said container, a cylinder connected to said head and suspended within said container, a piston reciprocally arranged in said cylinder, a switch actuating member connected with said piston and operating through said head, valve mechanism associated with the lower end of said cylinder, valve actuating means operatively connected with said valve mechanism, and a float operatively connected with said valve actuating means.

10. In a carbonating apparatus, in combination, a container, a gas pump, a water pump, a motor for operating said pumps, a switch for controlling the operation of said motor, a switch control lever including a detachable arm, a controller for said lever comprising an attachment including means for detachably connecting said attachment to said container, gas pressure actuated means connected with said attachment and suspended within said container, operating connections between said last mentioned means and said detachable arm of the switch control lever, means for controlling the admission of gas to and from said gas pressure actuated means, a float controlled by the rise and fall of water in said container, and operating connections between said float and said last mentioned controlling means.

11. In a carbonating apparatus, in combination with a vessel having a mixing chamber, gas and water pumps, motor and switch lever, of a controller attachment including a head, means for detachably connecting said head to said vessel, a lever operating means movable in one direction by pressure of gas and in an opposite direction by gravity, means controlling the supply of gas to and from said lever operating means, a float, and means actuated by the rise and fall of said float for actuating said last mentioned controlling means.

In witness whereof, I have hereunto affixed my hand this 29 day of April, 1922.

JOSEPH A. BOPPRE.